United States Patent [19]

Lazzari

[11] Patent Number: 4,731,157

[45] Date of Patent: Mar. 15, 1988

[54] PROCESS FOR THE PRODUCTION OF A MAGNETIC HEAD FOR PERPENDICULAR RECORDING

[75] Inventor: Jean-Pierre Lazzari, Corenc, France

[73] Assignee: Commissariat a l'Energie Atomique, Paris, France

[21] Appl. No.: 38,068

[22] Filed: Apr. 14, 1987

Related U.S. Application Data

[63] Continuation-in-part of Ser. No. 696,490, Jan. 30, 1985, abandoned.

[30] Foreign Application Priority Data

Feb. 3, 1984 [FR] France ................... 84 01880

[51] Int. Cl.[4] .................. B44C 1/22; C23F 1/02; C03C 15/00; C03C 25/06
[52] U.S. Cl. ...................... 156/643; 29/603; 156/653; 156/656; 156/657; 156/659.1; 156/668
[58] Field of Search ............ 156/643, 646, 653, 656, 156/657, 659.1, 661.1, 668; 360/110, 113, 121–123; 29/603, 606

[56] References Cited

U.S. PATENT DOCUMENTS

| | | | |
|---|---|---|---|
| 4,078,300 | 3/1978 | Lazzari | 29/603 |
| 4,190,872 | 2/1980 | Jones et al. | 360/125 |
| 4,256,514 | 3/1981 | Pogge | 156/643 X |

FOREIGN PATENT DOCUMENTS

| | | |
|---|---|---|
| 0031216 | 7/1981 | European Pat. Off. . |
| 0100620 | 6/1982 | Japan . |
| 0143709 | 9/1982 | Japan . |
| 2092807 | 8/1982 | United Kingdom . |

OTHER PUBLICATIONS

Journal of Applied Physics, vol. 53, No. 3, part II, Mar. 1982, pp. 2593–2595, American Institute of Physics, New York, US, M. Oshiki et al.
Patents Abstracts of Japan, vol. 4, No. 18 (E-171), 13 Feb. 1980, p. 35 & JP A 54 157 613 (Fujitsu K.K.).
Patents Abstracts of Japan, vol. 5, No. 146 (P-80) (818), 16 Sep. 1981; & JP A 56 80 814 (Fujitsu K.K.) 02-0-7-1981.
Patents Abstracts of Japan, vol. 6, No. 252 (P-161) (1130), 10 Dec. 1982; & JP A 57 147 117 (Sony K.K.).
Patents Abstracts of Japan, vol. 3, No. 56 (E-110), 15 May, 1979, p. 14, E 110; & JP A 54 34 219 (Canon K.K.).
Patents Abstracts of Japan, vol. 6, No. 46 (P-107) (924), 24 Mar. 1982; & JP A 56 163 517 (Fujitsu K.K.).

Primary Examiner—William A. Powell
Attorney, Agent, or Firm—Oblon, Fisher, Spivak, McClelland & Maier

[57] ABSTRACT

In a magnetic material film is etched a first wide, closed channel leaving intact an elongated central portion having a rectilinear axis. A coil is formed in the channel and surrounds the central portion, while being electrically insulated by a dielectric layer. A second channel is etched in a dielectric layer having a planar lateral edge parallel to the axis of the central portion and a thin magnetic film is deposited. A dielectric layer is deposited and etched by RIE, so as to leave a wall on the lateral edge. The magnetic film is then chemically etched so as to leave behind only the portion deposited on the lateral edge. Finally, the second channel is filled with a third hard dielectric material similar to the first.

1 Claim, 13 Drawing Figures

PROCESS FOR THE PRODUCTION OF A MAGNETIC HEAD FOR PERPENDICULAR RECORDING

BACKGROUND OF THE INVENTION

The present specification is a continuation-in-part application of U.S. application Ser. No. 696,490 filed on Jan. 30, 1985, now abandoned, in the name of the present applicant.

The present invention relates to a process for the production of a magnetic head for perpendicular recording. The invention is applicable to computer memory equipment.

In general, a magnetic head for perpendicular recording comprises a conductor winding arranged on a magnetic support, which has a main pole piece positioned at the centre of the winding. A thin magnetic film extends said pole piece and is flush with the surface of the head. This film is fixed between two thin plates.

For example, such a head is described in European Patent Application No. 0 031 216 filed on Dec. 11, 1980 and entitled "A magnetic head for perpendicular magnetic recording system" and published on July 1, 1981.

A known process for producing such a head comprises inserting a thin magnetic film between two plate-like elements. The assembly is then welded. The member obtained is then joined to a substrate, which comprises the main pole piece and its winding, the complete entity then being once again bonded.

It is clear that such a production process is difficult to perform and is not really suitable for automation or even industrialization. Moreover, for ease of handling reasons, the plate must have a certain thickness before inserting the magnetic film which is to act as the read and write pole. Thus, the pole is elongated (because its length is equal to the thickness of the plate), so that the efficiency of the head is reduced.

The Japanese patent published under No. 54-157613 describes a magnetic head comprising a central pole (6) etched in a magnetic substrate (4) and two pole pieces (9) surrounding the central pole. Such a head suffers from two major disadvantages. Firstly the central pole is very wide, so that the head efficiency is low. Secondly, the pole pieces are at the same level as the trajectory plane and the magnetic flux leaving the central pole immediately closes on the corners of said pole pieces, which leads to a disturbance of the magnetic field facing the central pole.

The Japanese patent published under No. 58-215713 describes a magnetic head in which the writing pole is constituted by a thin magnetic film (23). However, in this case, said film is deposited by atomization on the inclined flank of a metal coating (22). The whole is covered with an insulating layer (24), which must then be levelled and polished to define the trajectory plane of the head. Such a head suffers from two disadvantages. Firstly the magnetic pole is inclined, which leads to an asymmetrical magnetic writing field and secondly it requires a levelling and polishing operation.

SUMMARY OF THE INVENTION

The object of the present invention is to obviate these disadvantages. It therefore proposes a process making it possible to obtain a very thin magnetic pole (1 micron or less), which is strictly perpendicular to the trajectory plane of the head, with adjacent pole pieces, whereof the plane is located beneath the trajectory plane, which obviates disturbances to the writing field. Moreover, the process according to the invention makes it unnecessary to level and polish the head for defining the trajectory plane.

All these advantages are obtained by performing a process comprising the following operations: depositing a film of magnetic material on an insulating support, etching in said magnetic film a first wide, closed channel, which leaves intact a central elongated portion having a rectilinear axis, forming a coil in the channel surrounding the central portion by filling said first channel with a dielectric material to form a dielectric layer, etching of said dielectric layer, so as to obtain a spiral groove surrounding said central portion, depositing a conductive material in said spiral groove and filling said spiral groove with said dielectric material depositing a coating of a first hard dielectric material on the coil and the central portion, etching in said coating a second channel having a planar lateral edge parallel to the axis of the central portion and facing the latter, said second channel partly exposing the central portion, depositing a thin magnetic film on the hard dielectric layer and in the second channel, said magnetic film having longitudinal parts and one lateral edge, depositing a thin film of a second hard dielectric material, reactive ion etching of said second dielectric material so as to only leave a lateral edge deposited on the lateral edge of the magnetic film, chemicallly etching of the longitudinal parts of the magnetic film, stripping of the lateral edge of the second dielectric layer, so as to leave the lateral edge of the magnetic film, filling the second channel with a third hard dielectric material similar to the first hard dielectric material, the lateral edge of said magnetic film constituting a thin magnetic spacer between the first and the second hard dielectric materials.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
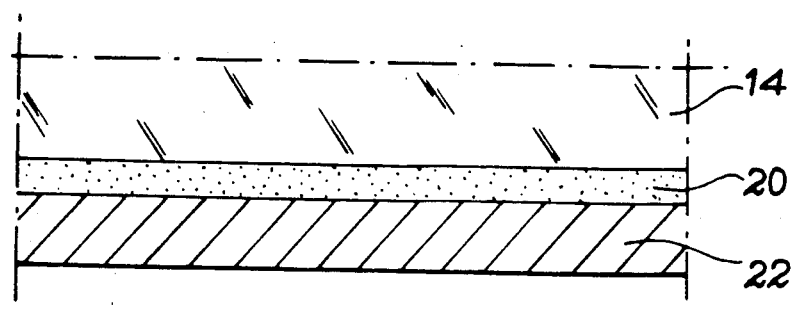
FIGS. 1 to 10 The main stages of the process according to the invention.

The dielectric support 14 shown in FIG. 1 is of a ceramic or other insulating material. According to a preferred embodiment of the invention, it is a silicon wafer. This support is covered with a silicon coating 20 obtained by thermal oxidation. This is followed by the deposition under vacuum or by any other adequate means of a magnetic film 22, which must have a strong magnetization and a high permeability. Different types of ferrites such as MnZn, NiZn or alloys such as FeNi or amorphous magnetic materials such as CoZr can be used. The thickness of the magnetic film 22 ranges between 0.5 micron to a few microns.

Figure 2:
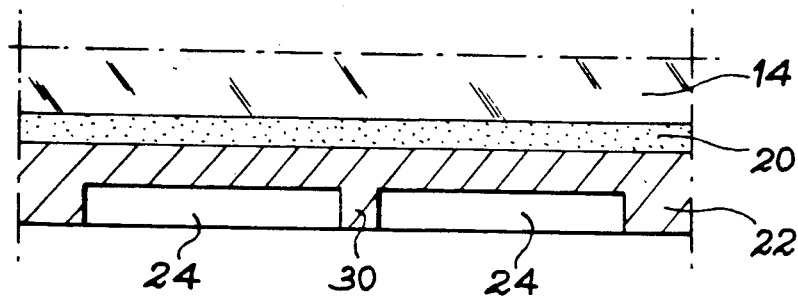
Figure 8:
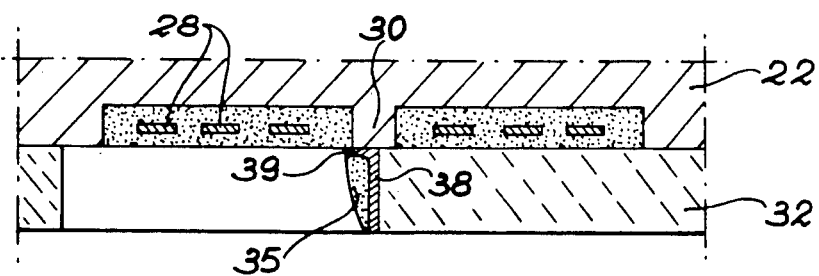

As a function of the material chosen, the coating 22 is etched either chemically or by reactive ionic etching. According to FIG. 2, a substantially elliptical or oval channel 24 is obtained. FIG. 8 shows this channel in plan view. This channel leaves intact a central rectilinear portion 30. A resin mask defined by photolithography is used for this purpose. For example, the etching depth can reach half the thickness of the film 22.

Figure 3:
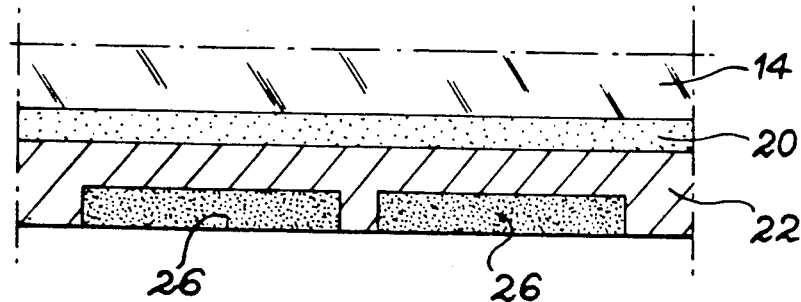

The channel 24 is then filled with a dielectric material 26, which can be silica, an organic resin or a compound based on Si(OH)$_4$. The result is represented in FIG. 3.

Figure 4:
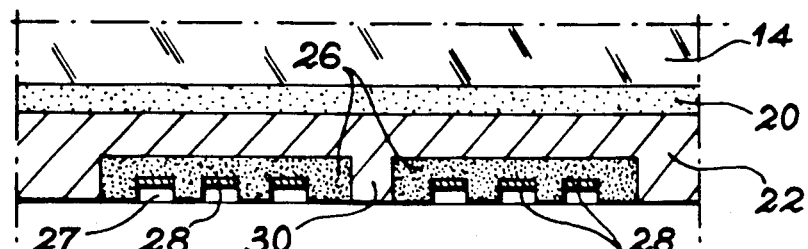

FIG. 4 shows the etching 27 of dielectric material 26. It is possible to use reactive ionic etching with a resin mask defined by photolithography. The etching, whereof a section is shown in FIG. 4, is shaped like a groove 27 having a rectangular section and a spiral shape, as can best be seen in FIG. 9.

This is followed by the deposition of an electrical conductor 28 at the bottom of the groove 27. A spiral coil is thus formed around the central pole piece 30. The coil inputs and outputs are not shown, because they cause no constructional problems. The groove 27 is then filled with a material identical to material 26.

Figure 5:
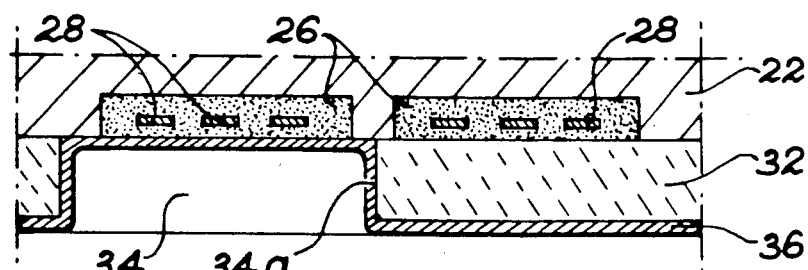

A hard dielectric layer 32 is then deposited on the entity (FIG. 5). This layer has a thickness between one and a few microns. It is formed from alumina, silica or any other hard dielectric material able to ensure a good mechanical interface with the surface of the magnetic recording disk (not shown in the drawings). In addition, layer 32 is used for insulating coil 28.

The hard dielectric layer 32 is etched in order to obtain a channel 34 having a planar wall 34a parallel to the axis of the central portion 30 and exposing roughly half the said portion 30.

A thin magnetic film 36 with a thickness less than one micron is then deposited. This film has a strong magnetization and a high permeability. It can be chosen from the same group of materials as those of film 22.

Figure 6:
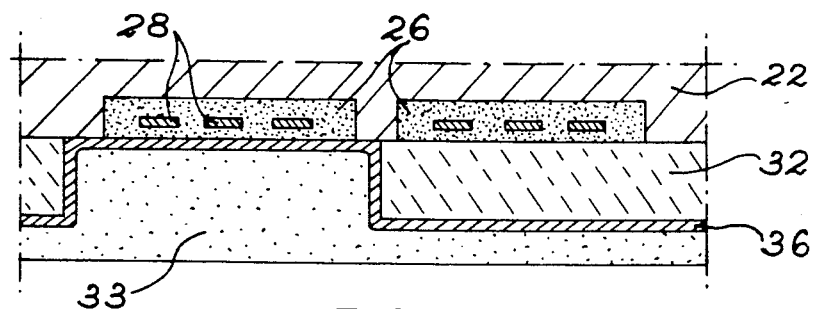
Figure 7:
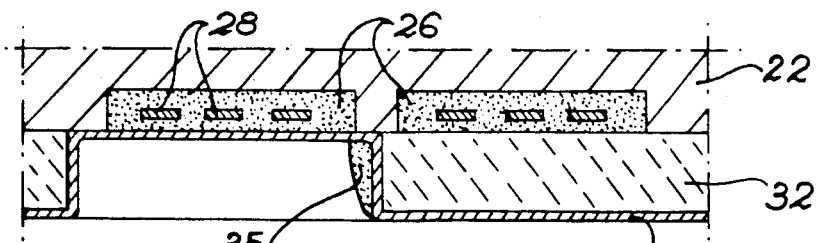

The magnetic film 36 cannot be etched as if it were an oxide coating using a conventional microelectronics procedure. It is known in this connection that it is possible to form quasi-vertical spacers with materials such as SiO$_2$ by forming a film of said material on a substrate in the form of a staircase (as for film 36), then by carrying out anisotropic etching by reactive ion etching (RIE) in order to remove the horizontal parts and leave behind a vertical wall. Such a procedure is e.g. described in U.S. Pat. No. 4,256,514 granted to Hans B. Pogge. However, this procedure requires that the material used is volatile, so that the etching of the horizontal parts leads to the disappearance thereof without affecting the vertical part. In the case of a magnetic film, like film 36, said procedure cannot be used, because metals like Fe or Ni are not volatile and consequently do not lend themselves to anistropic etching by RIE. Thus, one is confronted with a real problem, which the invention is able to overcome in the following way. On the complete film 36 is deposited a coating of a second dielectric material, such as a resin or an oxide like SiO$_2$ (FIG. 6). This coating is then etching by RIE, which only leaves behind a vertical wall 35 with a slightly rounded profile, i.e. with a widened base (FIG. 7). This anistropic etching is possible because material 33 is volatile.

Figure 9:
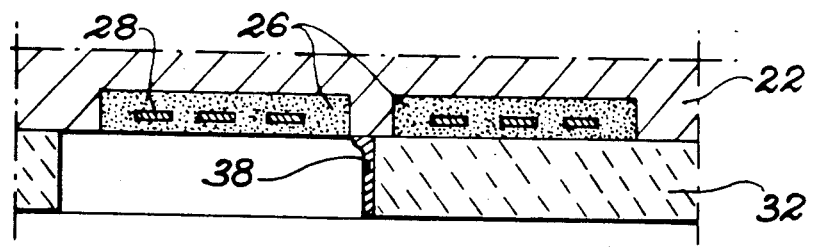

As the vertical part of magnetic coating 36 is protected by wall 35, it can be etched isotropically, e.g. by chemical etching. It then only leaves a vertical wall 38 (FIG. 8). The latter is extended by a foot 39, which makes it possible to have wide contact on base 30, which greatly improves the guidance of the magnetic field. It is then merely necessary to remove insulating wall 35 by stripping (FIG. 9). This gives a magnetic spacer 38 which is perfectly perpendicular to the plane of the head, which is very thin (because it has the thickness of coating 36, i.e. one micron or less), with a widened foot facilitating the passage of the magnetic flux.

Figure 10:
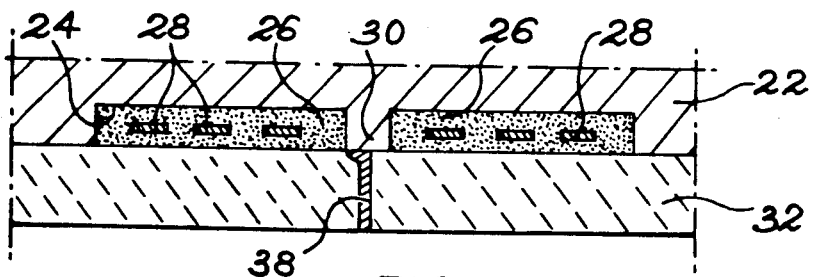
Figure 11:
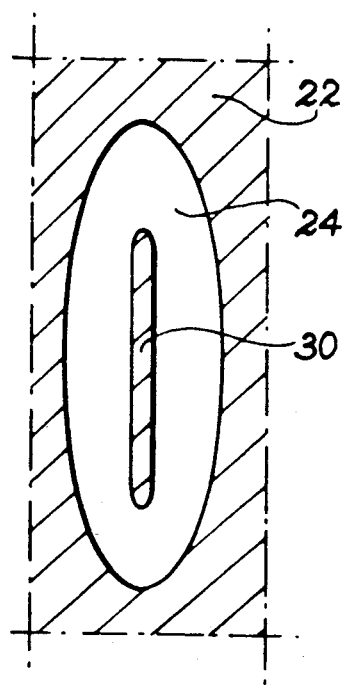
FIG. 11 A plan view of the channel.

Finally, channel 34 is filled with a third dielectric material, which may or may not be identical to that of layer 32. FIG. 10 shows the result obtained.

Figure 12:
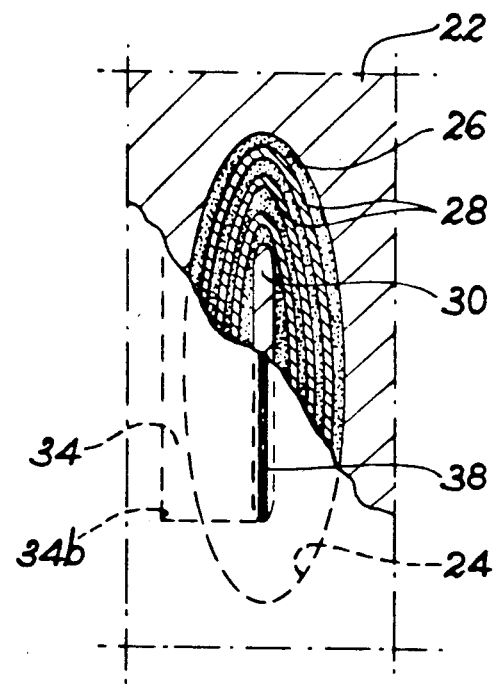
FIG. 12 An exploded plan view of the head obtained according to the invention.

FIG. 12 is an exploded plan view of the head in which it is possible to see channel 24, spiral coil 28, the rectilinear channel 34 with its wall 38.

Figure 13:
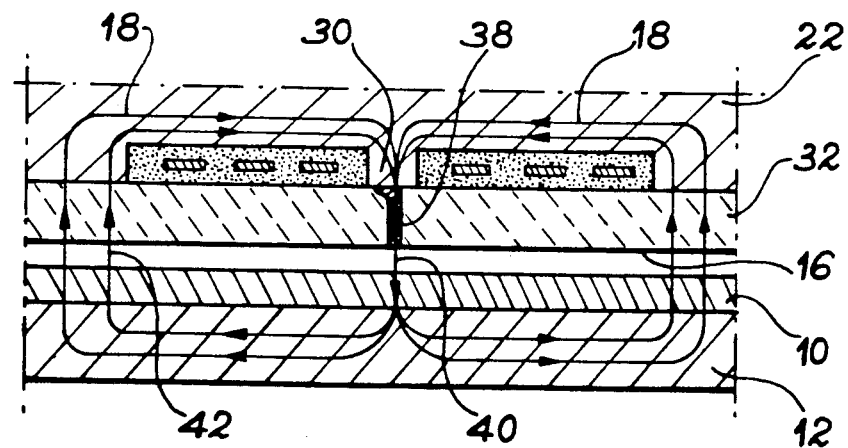
FIG. 13 A diagrammatic section of the read and write head.

FIG. 13 shows a magnetic read-write head for perpendicular recording according to the invention facing a magnetic recording disk. The latter is essentially constituted by a magnetic coating 10 with perpendicular anistropy and a high permeability, flux closure sublayer 12.

On writing, when coil 28 is tranversed by a current, it produces a magnetic flux channelled by the film 22 and concentrates in portion 30 and particularly in thin film 38. The latter, which is well coupled with the sublayer 12, produces an intense writing flux 40, which records the information elements in layer 10.

The closure flux 42 is significantly reduced compared with the main flux 40 because the distance separating the closure poles (coating 22) from layer 12 is greater than that separating the end of film 38 from said same layer 12 and the flux closure surface is very large compared with the section of film 38.

Moreover, the plane of pole pieces 22 is located beneath the trajectory plane 16, so that the pole pieces do not disturb the magnetic layer 12.

In a symmetrical manner, on reading, the flux produced by layer 10 follows the same path as during writing. The flux variation produces a current induced in winding 28 and a voltage at its terminals forming the reading signal.

What is claimed is:

1. A process for the production of a magnetic read-write head for perpendicular recording, comprising the steps of depositing a film of magnetic material on an insulating support, etching in said magnetic film a first wide, closed channel, which leaves intact a central elongated portion having a rectilinear axis, forming a coil in the channel surrounding the central portion by filling said first channel with a dielectric material to form a dielectric layer, etching of said dielectric layer, so as to obtain a spiral groove surrounding said central portion, depositing a conductive material in said spiral groove and filling said spiral groove with said dielectric material depositing a coating of a first hard dielectric material on the coil and the central portion, etching in said coating a second channel having a planar lateral edge parallel to the axis of the central portion and facing the latter, said second channel partly exposing the central portion, depositing a thin magnetic film on the hard dielectric layer and in the second channel, said magnetic film having longitudinal parts and one lateral edge, depositing a thin film of a second hard dielectric material, reactive ion etching of said second dielectric material so as to only leave a lateral edge deposited on the lateral edge of the magnetic film, chemically etching of the longitudinal parts of the magnetic film, stripping of the lateral edge of the second dielectric layer, so as to leave the lateral edge of the magnetic film, filling the second channel with a third hard dielectric materail similar to the first hard dielectric material, the lateral edge of said magnetic film constituting a thin magnetic spacer between the first and the second hard dielectric materials.

* * * * *